United States Patent

Abril

[11] Patent Number: 5,101,740
[45] Date of Patent: Apr. 7, 1992

[54] METHODS, APPARATUSES AND ROTARY FURNACES FOR CONTINUOUSLY MANUFACTURING CAERBON-RICH CHARCOAL

[75] Inventor: Pierre L. Abril, Marseille, France

[73] Assignee: Entreprise Generale de Chauffage Industriel Pillard, Marseille, France

[21] Appl. No.: 633,234

[22] Filed: Dec. 21, 1990

[30] Foreign Application Priority Data

Dec. 22, 1989 [FR] France ............... 89 17401

[51] Int. Cl.$^5$ ............................. D06F 75/00
[52] U.S. Cl. ............................. 110/230; 48/111; 48/209; 110/229; 110/246; 110/346
[58] Field of Search ............... 110/229, 230, 341, 346, 110/246; 48/209, 111; 202/100

[56] References Cited

U.S. PATENT DOCUMENTS

| | | | |
|---|---|---|---|
| 1,458,410 | 6/1923 | Hiller | 202/100 |
| 3,446,493 | 5/1969 | Imai | 110/204 X |
| 3,794,565 | 2/1974 | Bielski et al. | 302/100 |
| 4,037,543 | 7/1977 | Angelo | 110/214 |
| 4,541,345 | 9/1985 | Grumpelt et al. | 110/230 X |
| 4,734,166 | 3/1988 | Angelo, II | 202/100 |
| 4,797,091 | 1/1989 | Neumann | 110/229 X |

Primary Examiner—Edward G. Favors
Attorney, Agent, or Firm—Ladas & Parry

[57] ABSTRACT

The invention provides methods, apparatuses, and rotary furnaces for continuously manufacturing charcoal having a carbon content by weight which is greater than 95% of the total weight of carbon and volatile matter. Fragments of vegetable material contained in a hopper are inserted into a rotary furnace, with the transit time of the fragment through the furnace lying in the range 45 minutes to 60 minutes. The temperature in the front zone of the furnace where carbonization takes place is maintained in the range 900° C. to 1000° C. The furnace is heated by an axial burner which burns both combustible gases due to pyrolysis of the vegetable matter fragments and a second fuel. The charcoal falls into a hopper, from which it passes through a cooling chamber where it is colled by sprayed jets of water, after which it is extracted by an endless screw extractor. One application of the invention is manufacturing charcoal for making activated charcoal free from inorganic impurities.

10 Claims, 2 Drawing Sheets

METHODS, APPARATUSES AND ROTARY FURNACES FOR CONTINUOUSLY MANUFACTURING CAERBON-RICH CHARCOAL

DESCRIPTION

The present invention relates to methods, apparatuses, and rotary furnaces for continuously manufacturing charcoal having a high carbon content and a low content of volatile matter.

The field of the invention is that of manufacturing charcoal.

BACKGROUND OF THE INVENTION

Apparatuses are known for continuously manufacturing charcoal in a rotary furnace in which a temperature of about 650° C. to 700° C. is maintained in a carbonization zone. Ordinary charcoal is obtained at the outlet from the furnace having a maximum carbon content of about 85% and a volatile matter content of about 10% of the total weight.

Some metallurgical or chemical industries require charcoal having a higher carbon content, e.g. a carbon content which is greater than 95% of the total weight of charcoal plus volatile matter.

If such carbon-rich charcoal is made from coal, then the resulting product contains inorganic impurities (sulfur, phosphorus, traces of metal, etc. . . .), making it unsuitable for some uses. However charcoal made from wood does not contain such impurities, and is well suited to the requirements of certain industries, in particular for manufacturing activated charcoal for the chemical and pharmaceutical industries.

Carbon-rich charcoal has already been manufactured by discontinuous methods.

An object of the present invention is to provide means for manufacturing charcoal continuously in a rotary furnace and having a carbon content greater than 95% of the total weight of carbon plus volatile matter, with this result being achieved by adjusting the operating parameters of the furnace and certain details of the construction of the rotary furnace.

The term "charcoal" is used herein to designate charcoal of vegetable origin obtained by carbonization of wood or any other vegetable material.

The object of the invention is achieved by a method of carbonizing wood or vegetable matter in a rotary furnace in which the temperature of the carbonization zone lies in the range 900° C. to 1000° C. and the transit time through the furnace lies in the range 45 minutes to 60 minutes.

Preferably, the fragments of wood or vegetable matter inserted into the furnace have a particle size of less than 5 mm and a water content of less than 10% of total weight.

Advantageously, combustible gases due to pyrolysis are collected from the inlet of the furnace and a fraction thereof are reinjected to the outlet of the furnace so that the recycling of said gases equalizes the temperature of the gaseous atmosphere inside the furnace.

The invention provides apparatuses of the type comprising a rotary furnace in which vegetable matter is carbonized in a reducing atmosphere, and from which charcoal and combustible gases due to the pyrolysis of the vegetable matter are collected.

Apparatus of the invention further includes a hot gas generator fitted with a burner which is fed with a fraction of the pyrolysis gases leaving the furnace, and a drier which is heated by the hot gases produced by said generator and which serves to dry green wood and moist vegetable matter prior to delivering them to the rotary furnace for carbonization.

A rotary furnace of the invention is fitted with an axial burner, which burner is a two-fuel burner burning both a fraction of the pyrolysis gases leaving said furnace and a second fuel which arrives via a second duct, which second duct includes a motor driven regulator valve driven by a motor which simultaneously drives a second regulator valve disposed on the duct feeding the burner with combustion air, which motor is automatically controlled by a temperature regulation system so as to maintain inside the furnace both a reducing atmosphere and a temperature lying in the range 900° C. to 1000° C.

The effect of the present invention is continuous manufacture of charcoal with a carbon content greater than 95% of the total weight of carbon plus volatile matter.

This result is achieved by a special choice of operating parameters, in particular of a temperature in the carbonization zone lying in the range 900° C. to 1000° C., of a transit time through the furnace lying in the range 45 minutes to 60 minutes, and of a particle size of the vegetable matter which is less than 5 mm.

BRIEF DESCRIPTION OF THE DRAWINGS

An embodiment of the invention is described by way of example with reference to the accompanying drawings, in which.

DETAILED DESCRIPTION

Figure 1:
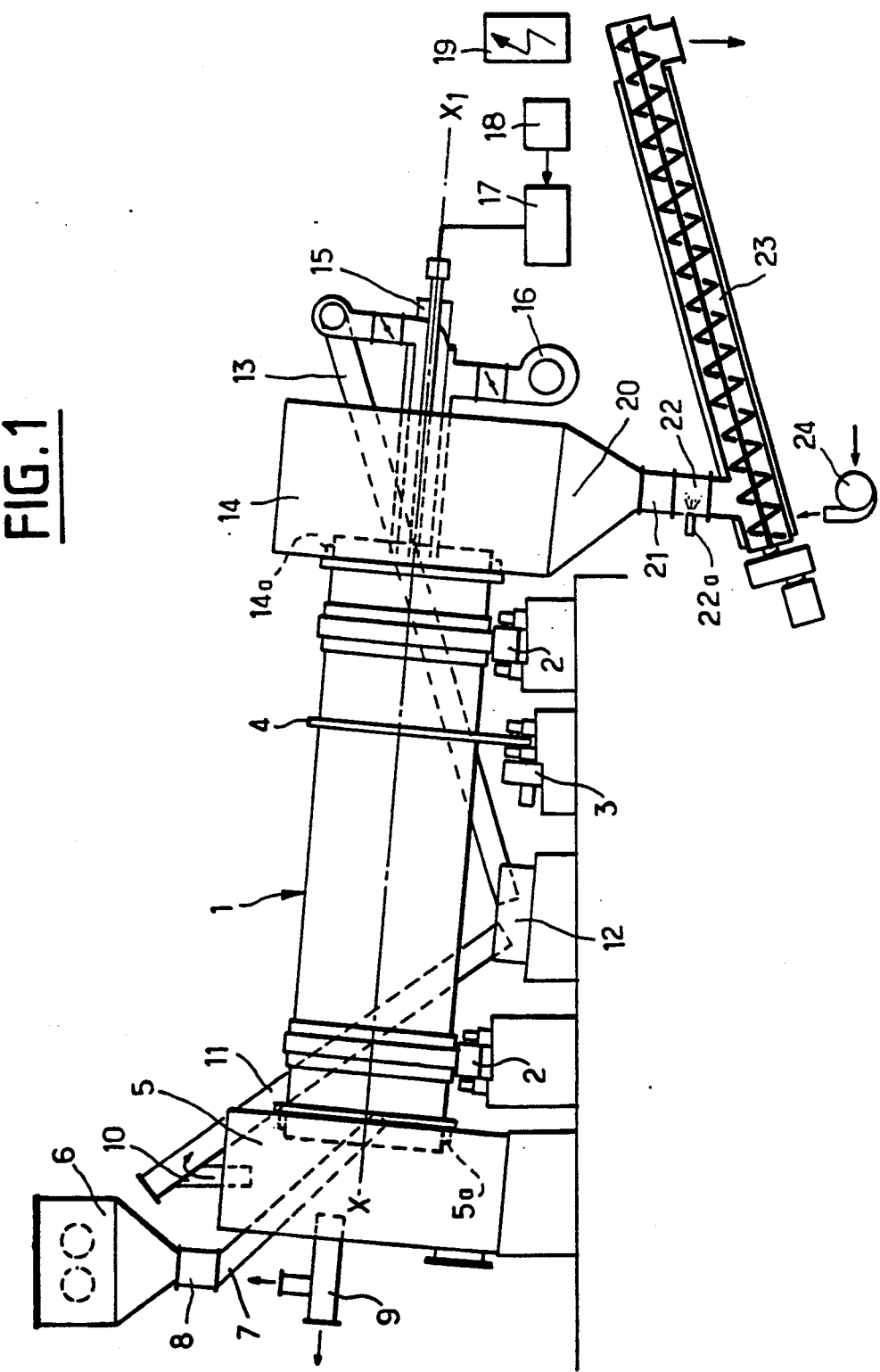
FIG. 1 is a diagrammatic elevation view of a rotary furnace in apparatus of the invention.

FIG. 1 shows a cylindrical rotary furnace 1 carried by free-wheeling rollers 2 on which it rotates, with rotary drive being imparted by a motor and gear box unit 3 via a chain which meshes with a peripheral toothed zone 4.

The axis $xx_1$ of the furnace slopes downwards towards the outlet from the furnace, i.e. towards its front end from which charcoal is extracted.

The rear end of the furnace penetrates into a stationary and air-tight chamber 5. A seal 5a is interposed between the outside wall of the furnace and the chamber 5.

Reference 6 designates a hopper for feeding the furnace, which hopper contains fragments of wood or any other vegetable matter suitable for being carbonized, e.g. coconut shells or palm nut shells, wood waste, etc. . . . The particle size of the fragments is relatively small, being less than 5 mm in all directions so as to make it possible to obtain good distillation of the volatile matter.

The bottom of the hopper 6 is connected to a chute 7 which passes through the chamber 5 and which penetrates into the rear end of the furnace, which rear end is open. An air-tight air lock 8 is interposed between the hopper and the chute in order to limit ingress of air.

The chamber 5 includes a first outlet 9 from which a fraction of the combustible gases due to wood pyrolysis is taken. These gases are delivered to a utilization, e.g. to a burner which serves to produce hot gases for feeding to a boiler and/or to a drier in which the raw material is dried prior to being fed into the hopper 6.

The heat budget of the operation makes it possible to dry green wood having a high water content.

The chamber 5 includes a second outlet 10 from which a second fraction of the combustible gases due to pyrolysis of the wood is removed. The outlet 10 is connected via a down duct 11 to a station 12 for dedusting the gas and having a second duct 13 extending therefrom.

The front end of the rotary furnace penetrates into an air-tight stationary chamber 14.

A seal 14a is interposed between the rotary furnace and the wall of the chamber 14.

The chamber 14 includes a refractory lining.

The front end of the furnace is open and the chamber 14 is fitted with a burner 15 passing through the chamber and penetrating axially into the furnace. Reference 16 designates a blower which feeds the burner with combustion air.

The burner 15 is a two-fuel burner capable of burning a liquid fuel and also of burning the pyrolysis gases that reaches via the duct 13. A liquid fuel is burnt to initiate the pyrolysis reaction. Thereafter the quantity of gas resulting from pyrolysis is more than enough for sustaining the reaction, and the burner operates using the gases coming via the duct 13, while another fraction of the combustible gases leaving via the duct 9 is used for operating auxiliary installations such as a boiler or a wood drier.

Advantageously, a fraction of the gases coming via the duct 13 is applied directly to the front end of the furnace and is recycled through the furnace since the atmosphere in the furnace is a reducing atmosphere and these gases cannot burn. The effect of recycling is to equalize gas temperature along the length of the furnace by reducing the temperature around the flame and by increasing the temperature at the outlet from the furnace, thereby ensuring that the temperature is kept higher than the tar condensation temperature.

References 17 and 18 designate burner equipments, i.e. sets of valves, control apparatuses, and pumps for the liquid fuel. Reference 19 designates a cabinet containing the electrical components and circuits for the burner and for the furnace.

The bottom end of the chamber 14 includes a hopper 20 into which the charcoal leaving the furnace drops on a continuous basis. This hopper is fitted with an air-lock 21 through which the charcoal falls under gravity.

At the outlet from the air-lock there is a cooling chamber 22 fitted with water spray means 22a which project a fine spray of water onto the hot charcoal. The latent heat of vaporization of the water is used to cool the charcoal down quickly, thereby preventing it from burning on coming into contact with the air. The charcoal leaves the furnace at a temperature of about 1000° C. and it leaves the chamber 22 at a temperature of about 200° C.

Reference 23 designates an endless extractor screw having two concentric walls between which a pump 24 causes cold water to flow. The charcoal that enters the extractor at a temperature of about 200° C. leaves it at a temperature of about 70° C. to 80° C., thereby avoiding any combustion on contact with the air.

Figure 2:
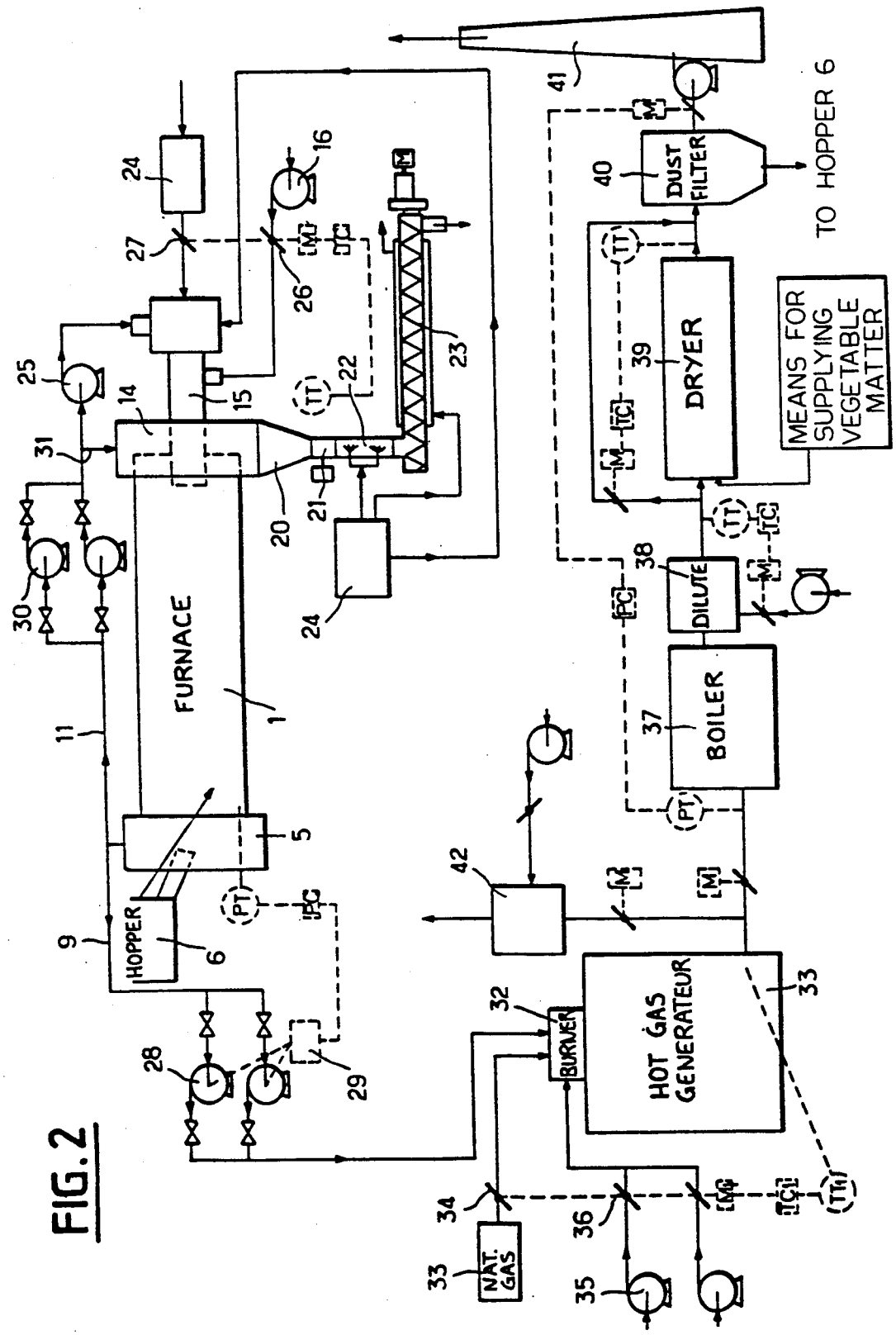
FIG. 2 is a diagram for explaining the method of the invention.

FIG. 2 is a block diagram of a complete installation for manufacturing carbon-rich charcoal from green wood or other vegetable raw material that requires prior drying.

This diagram shows a rotary carbonization furnace 1 identical to that shown in FIG. 1 and disposed between a rear chamber 5 and a front chamber 14 together with the hopper 6 which delivers fragments of wood or other vegetable material into the rear end of the furnace. There can also be seen a burner 15 which is fed with combustion air by a blower 16.

The quantity of air delivered by the blower in well below the stoichiometric ratio, thereby providing a reducing atmosphere inside the furnace.

The burner 15 is a gas burner capable of burning natural gas as delivered via a set of valves 24 and also capable of burning the pyrolysis gases sucked in by a blower 25.

The temperature inside the furnace is regulated by a regulator system which comprises a temperature sensing probe TT, a regulator TC and a servomotor M which simultaneously controls both a regulator valve 26 on the combustion air inlet and a regulator valve 27 placed on the natural gas feed to the burner.

The quantity of pyrolysis gas fed to the burner is kept constant. The temperature in the furnace is regulated to between 900° C. and 1000° C. to obtain almost complete distillation of the volatile matter in the wood, and thus obtain charcoal which is very poor in volatile matter and rich in carbon.

The combustible gases leaving the rear chamber 5 are delivered to two circuits.

A first circuit 11 includes two blowers 30 connected in parallel. On leaving the blowers 30, a fraction of the gases is directed into the chamber 14 by a duct 31. This fraction of the gases is recycled through the furnace and serves to equalize gas temperature along the furnace. Another fraction of the gases delivered by the blowers 30 is taken up by the blower 25 which delivers it to the burner 15.

A second circuit 9 includes two blowers 28 connected in parallel and driven by a variable speed drive 29.

The pressure inside the furnace is regulated by a system including a sensor PT for sensing the pressure inside the furnace and a pressure regulator PC which delivers a control signal to the variable speed drive 29. The pressure inside the furnace is maintained slightly higher than atmospheric pressure, e.g. at a pressure which is 0.5 mm of water higher than atmospheric so that there is no danger of outside air penetrating into the furnace.

The air delivered by the blower 28 which is in operation is fed to a burner 32 fitted to a hot gas generator 33. The burner 32 may be a two-fuel burner which is also fed with natural fuel gas via a set of valves 33 and a motor driven regulator valve 34. The burner is fed with combustion air via two blowers 25 connected in parallel and each fitted with a motor driven regulator valve 36.

The temperature of the hot air produced by the generator is regulated by a temperature probe $TT_1$ and by a temperature regulator $TC_1$ which controls a motor $M_1$ which drives the regulator valves 34 and 36 simultaneously.

The air leaving the generator 33 at a temperature of about 950° C. feeds a boiler 37 which provides steam that may be used, for example, for agglomerating the charcoal leaving the furnace.

The air leaving the boiler at a temperature of about 390° C. is mixed with cold air in a dilution box 38 which it leaves at about 300° C., and it feeds a drier 39 in which green wood or moist ligneous products are dried prior to being delivered to the hopper 6.

Reference 40 designates a dust filter and reference 41 a smoke chimney. Reference 42 disignates a dilution box placed upstream from a chimney into which hot air is rejected, when necessary.

FIG. 2 shows the hopper 20 fitted with an air lock 21, the cooling chamber 22 fitted with water spray means, and the endless screw extractor 23.

Charcoal particles are obtained at the outlet from the extractor having a ratio of carbon weight to total weight of carbon plus volatile matter which is greater than 95%. The operating parameters that enable this result to be achieved are as follows:

the particle size of the fragments inserted into the furnace is less than 5 mm, the temperature in the carbonization zone lies in the range 900° C. to 1000° C., and the total transit time through the furnace lies in the range 45 minutes to 60 minutes for feed stock to the furnace having a moisture content of less than 10% total weight.

The ash percentage in the products obtained depends solely on the nature of the feed stock to the furnace, and naturally it is advantageously to use feed stock containing as little ash as possible in order to obtain as high a carbon content as possible.

For proper operation of the furnace it is essential to provide seals between the outside of the furnace and the walls of each of the stationary chambers 5 and 14.

In a preferred embodiment, each of these two seals is constituted by soft blocks of graphite juxtaposed to form a ring. The blocks are held in a support fixed to the wall of the chamber and they are loosely mounted against a ring which is accurately machined around the periphery of the furnace, with contact being air-tight.

Soft graphite seals withstand temperature and have a very good friction coefficient, standing up well to abrasion by carbon dust which becomes encrusted in the graphite and does not run any risk of introducing traces of impurity into the furnace since such dust is made of carbon.

I claim:

1. A method of continuously manufacturing charcoal having a carbon content by weight which is greater than 95% of the total weight of carbon plus volatile matter, the charcoal being obtained by carbonizing vegetable matter in a rotary furnace, wherein the temperature in the carbonization zone of the furnace lies in the range 900° C. to 1000° C., and the transit time through the furnace lies in the range 45 minutes to 60 minutes.

2. A method according to claim 1, wherein the vegetable matter inserted into said rotary furnace has a particle size of less than 5 mm.

3. A method according to claim 1, wherein the vegetable matter inserted into said rotary furnace has a moisture content of less than 10% total weight.

4. A method according to claim 1, wherein a fraction of the combustible gases collected in the inlet of said rotary furnace is injected into the outlet of the rotary furnace with the recycled gases equalizing the temperature of the gaseous atmosphere inside the furnace.

5. A method according to claim 1, wherein said rotary furnace is heated by a two-fuel burner which burns a fraction of the gases due to pyrolysis of said vegetable matter, and also a second fuel, with the temperature inside the furnace being contained substantially constant by acting simultaneously on the flow rate of the second fuel and on the flow rate of combustion air so as to maintain a reducing atmosphere inside the furnace.

6. A method according to claim 1, in which a fraction of the pyrolysis gas is extracted by means of a blower driven by a variable speed drive, and the speed of said blower is regulated automatically to maintain a pressure inside the furnace which is slightly higher than atmospheric pressure in order to prevent air from penetrating into the furnace.

7. Apparatus for manufacturing charcoal from vegetable matter, said charcoal having a carbon content by weight which is greater than 95% of the total weight of carbon plus volatile matter, the apparatus comprising a rotary furnace for carbonizing the vegetable matter in a reducing atmosphere to produce charcoal and pyrolysis gases, means for recovering the charcoal and the pyrolysis gases from the rotary furnace, a hot gas generator fitted with a burner, means for feeding the pyrolysis gases from the furnace to the hot gas generator, a drier connected to said hot gas generator for receiving hot gases therefrom and means for supplying said vegetable matter to said drier prior to delivery of the vegetable matter to said furnace for drying said vegetable matter.

8. A rotary furnace for an apparatus for manufacturing charcoal having a carbon content by weight which is greater than 95% of the total weight of the carbon plus volatile matter, said charcoal being manufactured from vegetable matter, said vegetable matter being carbonized in the furnace to produce charcoal and pyrolysis gases, said furnace comprising an axial burner constituted as a two-fuel burner for burning both a fraction of the pyrolysis gases leaving said furnace and a second fuel, a duct connected to said burner to supply said second fuel thereto, a regulator valve in said duct, a second duct for feeding the burner with combustion air, a second regulator valve disposed in said second duct, a motor drivingly connected to both said regulator valves and temperature regulation means coupled to said motor for driving said regulator valves to maintain, inside the furnace, both a reducing atmosphere and a temperature in the range of 900° C. to 1000° C.

9. A furnace according to claim 8, in which the front end of said furnace opens out into a stationary chamber containing a hopper at its base, which hopper receives the charcoal leaving said furnace, said hopper communicating via an air-lock with a cooling chamber fitted with water spray means so that the charcoal is cooled suddenly from a temperature of about 1000° C. to a temperature of about 200° C.

10. A furnace according to claim 9, further including an endless screw extractor which is disposed beneath said cooling chamber, which extractor comprises two concentric walls and means for causing cold water to flow in the space between the two walls so that the carbon transported by said extractor enters it at a temperature of about 200° C. and leaves it at a temperature of about 70° C. to 80° C.

* * * * *